Figures 1, 2:
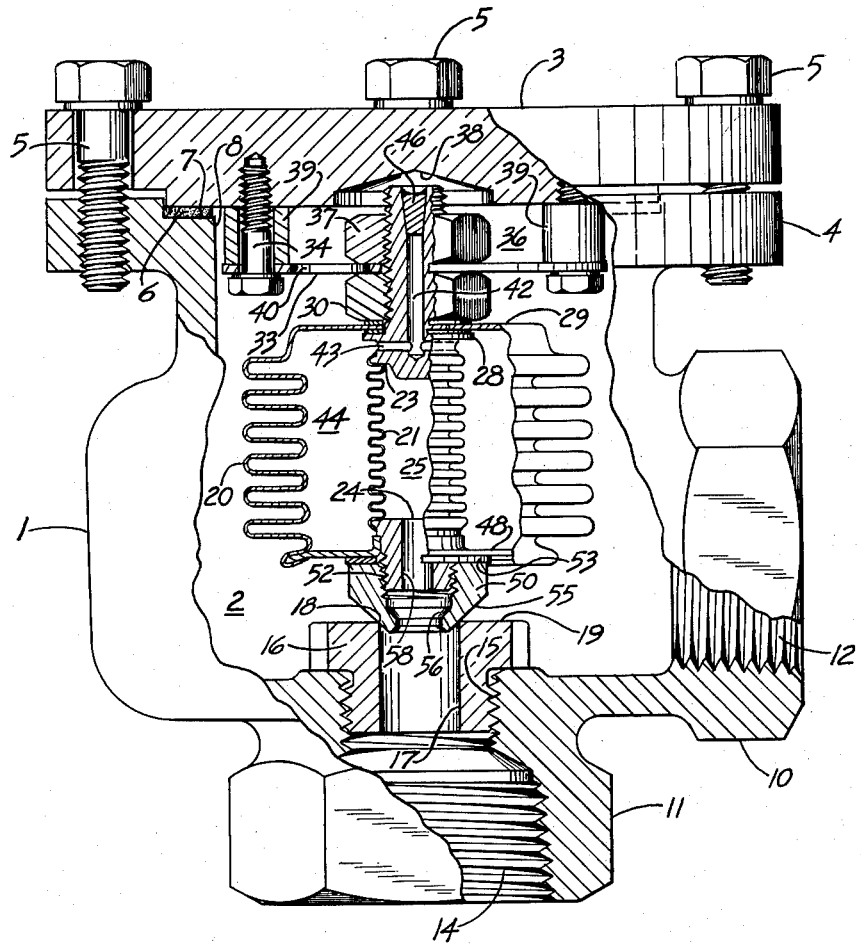

June 13, 1961 F. W. HOTTENROTH 2,988,282
FLUID SEPARATING VALVE
Filed March 31, 1959

INVENTOR.
Frederick W. Hottenroth
BY Bosworth, Sessions,
Herrstrom and Knowles
Attorneys

United States Patent Office 2,988,282
Patented June 13, 1961

2,988,282
FLUID SEPARATING VALVE
Frederick W. Hottenroth, 2170 Chatfield Drive,
Cleveland Heights, Ohio
Filed Mar. 31, 1959, Ser. No. 803,280
8 Claims. (Cl. 236—58)

This invention relates to fluid condensate valves, more particularly to an improved construction for a steam trap of the bellows actuated type.

In heating and refrigerating systems wherein fluids are circulated continuously and pass through gas and liquid phases, it is customary to provide separation valves which, at some point or points in the fluid path of any particular system, check the flow of gas vapor steam, as the case may be, while allowing fluid in the liquid state, such as water or refrigerant, to pass on or continue flowing in the system. The illustrative embodiment of present invention is a device which differentiates between steam or gas on the one hand and water or condensate on the other hand, opening to pass the water or condensate and closing to arrest the flow of gas, steam or vapor; it is designed especially for use in a steam or vapor heating system. It is to be understood, however, that the principles involved are applicable to the design of condensate separation valves for use in other systems such as air conditioners and refrigerators.

Various types of condensate separator valves or steam traps have been devised, the present invention being directed to improvements in a valve or trap of the type employing an expansible and contractable bellows as an actuator for a valve body mounted for movement toward and away from a seat formed about the outlet passage of a casing into which steam or vapor is admitted and the condensate is drained. In such a device it is customary to place a quantity of the fluid being controlled inside the bellows to serve as the thermally responsive actuating medium. Thus in a steam heating system the bellows may contain primarily water and water vapor, being otherwise evacuated, so that when contacted by steam the bellows is expanded by the increase in internal vapor pressure and the valve closes; when the bellows is contacted by the water condensate at a temperature lower than that of the steam in the system, the vapor pressure inside the bellows is reduced and the bellows contracts and opens the valve to allow the water or condensate to drain out.

In the conventional bellows actuated steam trap the area of the circular valve seat is alternately subtracted from and restored to the effective external area of the bellows as the valve is alternately closed and opened. Accordingly, such a steam or condensate trap is likely to be insensitive in operation. Moreover, such a valve tends to snap open because of the increased external area over which opening pressure is effective as soon as the valve body clears the seat. This relatively increased effective area also delays the closing with resultant loss of vapor or steam through the outlet.

It is therefore the principal object of the present invention to provide an improved steam trap or condensate valve of the bellows actuated type in which provision is made for balancing the forces acting on the valve body and to achieve smooth opening and closing action. More particularly it is sought to provide such a valve wherein the actuating bellows is relieved of an effective area substantially equivalent to that of the valve seat so that the effective working area of the bellows is the same whether the valve be open or closed.

Another object is to provide a bellows actuated condensate valve of relatively large capacity achieved by using a valve seat of larger diameter than heretofore feasible with conventional designs. More specifically, the present invention employs a bellows assembly which compensates for the area of the valve seat, thereby eliminating the valve seat area as a critical factor in the design.

A further object is to provide such a valve wherein the actuating means comprises a pair of bellows disposed one within the other in coaxial relation with one of the bellows having an effective cross sectional area substantially equivalent to that of the valve seat.

A further object is to provide a bellows actuated valve wherein the bellows assembly is mounted within the valve casing in insulated relation to minimize conduction of heat between the casing and such assembly.

Other objects and advantages relate to certain combinations of parts and features of construction providing a generally improved condensate valve of high efficiency that opens and closes on a relatively low temperature differential and which has a smooth modulated action providing a substantially continuous discharge of condensate during normal operation of the system in which the valve is installed. The objects and advantages will become apparent from the following detailed description of a preferred embodiment representing the best known mode of practicing the invention. This description is made in connection with the accompanying drawings forming a part of the specification.

In the drawings:

FIGURE 1 is a sectional view taken along the working axis of an improved steam trap incorporating a pair of coaxial corrugated metal bellows and constructed and arranged to function in accordance with the principles of the present invention; and FIG. 2 is a plan view of the heat insulating mounting plate for the bellows assembly.

The device of the present invention comprises a casing 1 which may be a casting of suitable material such as metal; for example, brass or iron. The casing is hollow, defining a working chamber 2 having a top access opening 8 fitted with a cover 3. A circular flange 4 formed integrally on the casing 1, surrounding and outwardly directed from the top opening, is apertured at circumferentially spaced intervals to receive fasteners such as cap screws 5 which extend into aligned threaded holes in the periphery of the cover 3 to hold and clamp the cover in place. A deformable sealing gasket 6 of suitable material such as cork composition is interposed between the casing and the cover, preferably being locatingly received in a circular rabbet 7 formed in the casing about the circular top opening.

Integral tubular bosses 10, 11 are formed on the side and bottom, respectively, of the casing for attachment of the trap to pipes of the heating system in which the device is to be installed such as for example, as the radiator drain or discharge and the condensate return. These hollow bosses are formed with suitable means for attachment. For example, they may be formed with either external or as shown tapered internal threads for connection to or into conventional iron pipe, pipe fittings or radiator bosses. Inlet passage 12 formed in the boss 10 opens directly into the working chamber 2. Outlet passage 14 at its inner end is formed with an internally threaded reduced coaxial section 15 into which is screwed a brass or bronze bushing 16 provided with a through passage 17 continuous with the outlet passage 14. At the chamber end of the fitting 16 the passage 17 terminates in a circular valve seat 18 which may be the beveled edge corner at the intersection of the circular passage 17 and flat end face 19 of the bushing 16.

Supported inside the hermetically sealed working chamber 2, in suspended relation from the cover 3, is an actuating assembly comprising an external main bellows 20 and an internal supplemental or compensating bellows 21. Each bellows is of conventional construction, and is formed of high heat conductivity material, preferably a metal such as brass or Monel. With respect to the bellows, the drawings are somewhat diagrammatic for simplicity, it being understood that various types of bellows may be used such as those spun from tubes or formed of helical edge bonded strips.

Each bellows is of circular section, its folds or corrugations permitting axial elongation and contraction in operation. The ends of the inner bellows 21 are received over and soldered or brazed to radially outwardly projecting circular lips on the confronting ends of spaced coaxial top and bottom end members 23, 24. These end members and the internal bellows define an internal or compensating chamber 25 which has and is characterized by an effective diameter substantially equal to the diameter of the valve seat 18 so that the effective cross sectional area of the bellows is substantially equal to that of the valve seat.

At a point spaced axially from and above the end lip to which the upper end of the internal bellows 21 is attached, the upper fitting 23 is formed with a surrounding circular flange 28 providing an annular radial surface against which is received upper end 29 of the main bellows 20. The bellows end is clamped between the flange 28 of the end member and a nut 30 screwed onto the reduced diameter threaded body portion of the fitting. Deformable sealing washers are preferably interposed between the underside of the bellows end 29 and the flange 28 of the end member and also between the topside of the bellows end and the clamping nut 30.

The threaded body of the end member 23 extends upwardly through a central opening 32 (FIG. 2) in a circular mounting plate 33 formed of suitable material of relatively low heat conductivity such as stainless steel. This mounting plate is made fast to the inside of the cover 3 as by a plurality of cap screws 34 received through marginal apertures 35 of the mounting plate and screwed into blind threaded holes in the inside surface of the cover. Tubular spacers 39 also of low heat conductivity material such as stainless steel, are interposed between the mounting plate 33 and the cover 3 so that the mounting plate stands off from the cover with an intervening insulating space indicated at 36. A holding nut 37 is received on the threaded end member 23 and tightened against the upper surface of the mounting plate 33 to hold the bellows assembly rigidly in place. The cover 3 is relieved internally to provide a recess 38 which accommodates the upper end of the fitting 23. By this mounting arrangement, heat conductivity between the casing and the bellows assembly is minimized. A number of cut-outs or openings 40 may be formed in the mounting plate 33 to impart a spiderlike shape to the central portion to which the bellows assembly is secured. The insulating characteristics of the mounting arrangement are thus increased by reducing the cross section of metal over which heat is conducted between the casing and the thermally sensitive bellows assembly.

The upper end member 23 is drilled or otherwise formed with an axial drilled passage 42 communicating through lateral drill holes or passages 43 with main chamber 44 comprising the annular space between the two bellows. The lower end of the axial drill hole 42 is closed so there is no communication between this passage and the compensating chamber 25. The openings of the lateral passages 43 into the main bellows chamber 44 occur in that portion of the upper end member 23 located between the annular lip to which the inner bellows 21 is soldered and the flange 28 against which the end member 29 of the outer bellows is seated. After the main chamber 44 has been charged with water or other fluid or fluid mixture, the filler passage 42 is sealed as by a tapered closure plug 46 which, preferably, is soldered in place.

The other or lower end member 24 is received through and rigidly secured to circular end plate 48 of the outer bellows and is screwed into a tapped portion of the center through opening in a valve body 50 of specialized construction. The bellows end plate 48 is circular in shape, its outer periphery being embraced by the lower end of the flexible portion of the metal bellows 20 with the material of the bellows marginally bent over the plate edge and soldered to form an hermetic seal. An axial cylindrically shaped flange around the center opening of the plate 48 embraces the end member 24, the edge of this flange being locatingly seated against an external radial shoulder of the end member. Tightening of the valve body 50 onto the end member 24 by means of the threaded joint 52, preferably with an annular sealing washer 53 interposed between the valve body and the end plate 48, clamps the end plate against the shoulder of the end member 24 to provide a rigid unitary end construction on the bellows assembly. To insure an hermetic seal of the chamber 44, the plate 48 and the end member 24 are preliminarily soldered together before the valve body 50 is screwed into place.

The bottom or working face of the valve body 50 is formed with a frusto conical surface 55, concentric to the axis of the bellows assembly and engageable with the valve seat 18 to seal the opening into the outlet passage 17, 14. The valve body also has a central axial passage 56 which opens downwardly through the end face of the valve body inside the sealing surface 55 and is continuous with the compensating or internal bellows chamber 25 through an axial passage 58 formed in the lower end member 24. Thus, when the valve body is seated, as in FIG. 1, the internal bellows chamber 25 is in free communication with the outlet through the passage 56, 58 with the result that axial fluid pressure forces on the valve body are balanced over the area of the valve seat 18. The effective area of the compensating or inner bellows 21 is substantially equal to the area defined by the valve seat 18.

The annular chamber 44 between the inner and outer expansible metal bellows 21, 20 is charged with a suitable fluid such as water or water-alchol mixture in the case of a condensate valve to be used as a trap in a steam or water vapor heating system. The charging is done conventionally; the procedure, briefly described, involving placement of a small quantity of the fluid into the chamber 44 through the filler passage 42 this being accomplished, of course, before the plug 46 is in place. The bellows assembly is evacuated to remove substantially all of the air from the chamber 44 and, with the bellows assembly so evacuated, the plug 46 is inserted and sealed. This charging of the bellows assembly is conveniently accomplished in production before the bellows assembly is secured to the cover 3 and while it is outside the casing 1.

The lengths of the main and supplemental bellows 20, 21 are such that in its free state, that is to say, with the same gas and vapor pressure both inside and outside the main chamber 44, the valve body 50 engages the valve seat 18 with the bellows slightly compressed from their natural or unsupported lengths. In other words, the free length of the bellows assembly is greater than the distance between the anchorage and the valve seat. Such a structural relationship recognizes the spring-like characteristics of the metal bellows 20, 21. Thus, when the vapor and gas pressure effective inside the sealed chamber 44 is equal to that of the effective pressure in the working chamber 2, the bellows assembly is in equilibrium and the valve body 50 seals the outlet and is held in sealing engagement with the seat by an axial force provided by gravity and the slight compression of the bellows 20, 21 to lengths shorter than their free lengths.

Assuming the trap is installed in a steam heating system with the inlet 12 connected to a radiator so as to receive condensate and steam from the radiator and that the outlet 14 is connected to a pipe of the condensate return system, the trap or valve will be open since the pressure in the working chamber 2 of the casing will exceed the vapor pressure in the bellows chamber 44, the valve having been set when the water or other liquid fill was sealed in the bellows assembly for an equilibrium temperature somewhat above that which prevails in the casing chamber 2 when the radiator is cold. Thus, as steam is admitted to the radiator it condenses and runs into the working chamber 2 of the trap through the inlet 12, the open condition of the valve with the valve body 50 withdrawn from the seat 18 allowing the condensate to exit through the outlet 17, 14.

When steam enters the chamber 2 the liquid-vapor fill in the bellows chamber 44 is rapidly heated through the thin corrugated wall of the bellows 20 and the increase in internal pressure resulting from the heating allows the bellows assembly to expand axially and seat the valve body 50, closing the outlet and trapping the steam in the radiator.

In the closed condition, the pressure in the working chamber 2 tending to raise the valve off its seat acts over an area represented by the effective diameter of the outer bellows 20 less the circular area of the valve seat 18. The internal pressure in the bellows chamber 44 acts downwardly to hold the valve body against its seat and opposes the pressure in the casing chamber 2 over an area equal to the effective area of the main or outer bellows 20 to the end member 48, less the effective area of the inner or auxiliary bellows 21 to the end member 58. Since, by design, the effective area of the auxiliary bellows 21 is substantially equal to the area of the valve seat 18 and is subtracted from the total end area of the main bellows 20, the opposed pressures act over equal areas. Accordingly, when the device is in equilibrium, that is, when the vapor pressure in the bellows chamber 44 is equal to the pressure in the working chamber, the valve body 50 is held against its seat by gravity and the resiliency or spring force of the metal bellows 20, 21.

As steam is condensed in the radiator, the condensate flows into the working chamber 2 and progressively immerses the bellows assembly. When such condensate, which is colder than the steam, reduces the effective internal vapor and gas pressure in the bellows chamber 44, the pressure in the working chamber 2, acting over the external annular area referred to, overcomes the closing forces acting on the valve body 50, including the internal vapor pressure in the bellows chamber 44 acting over the equvalent effective annular area, and raises the valve body off its seat to permit exit of the accumulated condensate.

It is significant that since the opposed fluid pressures influencing the valve to move act over substantially equal areas, the valve is opened upon the occurrence of a relatively small temperature differential. The operation is thus distinguished from that of a conventional trap having a single bellows. In the latter a greater temperature differential is necessary since the internal bellows pressure acts over an area greater than the area over which the working chamber pressure is effective by an amount equivalent to the area of the valve seat. When the working chamber or external pressure of a conventional valve finally forces the valve body off its seat, the area over which the opening pressure is effective is immediately increased by the area of the valve seat with the result that the valve is snapped to full open position. Hence, to close the conventional valve, a relatively greater temperature increase is required than in the device of the present invention because a greater pressure and therefore force differential must be overcome. The present valve maintains closer control over the condensate flow, requiring only a relatively small temperature differential for both opening and closing. Moreover, the gradual opening characteristic of the present valve as distinguished from the snap opening of a conventional valve achieves a modulated action in which the valve tends to remain open at that position which obtains a substantially continuous flow of the condensate through the outlet at a rate determined by the steam consumption. For example, the gradual opening avoids rapid run out of condensate and thereby prevents inrush of steam to snap the valve closed. Formation of condensate at an increased rate however, causes greater cooling of the bellows assembly with a reduction in the vapor pressure in the bellows chamber 44 which permits an increase in the valve opening until the increased spring reaction of the bellows 20, 21 just balances the reduction in internal pressure. In a conventional valve the snap opening and closing results in intermittent discharge of condensate rather than the even flow obtained by the present device.

In all positions of the valve and whether it be open or closed, the working area of the bellows assembly includes an area equivalent to the valve seat area or substantially so, which is subjected only to balanced axial fluid pressure forces. At steady state operation the fill pressure in the bellows chamber 44 plus gravity and the spring action of the bellows produce a closing force equal to and balanced by the opening force resulting from the pressure in the casing chamber 2. At the instant of closing, the area over which the opening pressure is effective remains constant so that opening is initiated on slight temperature rise, whereas in a conventional valve such area is instantly diminished by the valve seat area.

In the device of the present invention, wherein opening and closing is effected by relatively small temperature changes, the insulated mounting for the bellows assembly is of particular significance. By minimizing heat conduction between the casing 1 and the bellows assembly the latter tends to respond exclusively to thermal changes produced by the condensate and the steam rather than by conduction from the casing body 1 which may be subject to varying ambient temperature conditions.

By reason of the modulated action which tends to hold the valve open as distinguished from the snap action opening and closing of conventional valves, the present invention obtains numerous collateral advantages. Chattering and hammering is minimized, the temperature of the trap, particularly the working valve body and valve seat, tends to remain relatively constant with resultant minimization of wear and deterioration and prolongation of the useful life of the device. Elimination of the area of the valve seat as a factor affecting the area over which the opening pressure is effective allows the trap to be designed with a relatively large area valve seat with attendant increase in capacity. Use of the principles of the present disclosure in other devices having to do with fluid flow control will be apparent to those conversant with the art and is intended to be covered.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. A temperature sensitive fluid flow control valve comprising a hollow casing defining a working chamber and having inlet and discharge passages opening into such chamber, means providing a valve seat about the discharge passage opening, first and second bellows elements disposed one within the other in spaced relation and both within the chamber, the inner bellows having one end thereof closed, said bellows elements cooperatively defining a closed expansion chamber entirely within the casing and sealed from the working chamber, a valve body fast to both bellows elements, means securing the bellows elements to the casing for movement of the valve body to and from the valve seat upon expansion and contraction of such elements, and means providing a pressure equalizing fluid passage between the open end of said inner bellows element and the discharge passage, said pressure fluid equalizing passage extending into said valve seat.

2. A valve as defined in claim 1 in which the two bellows elements expand and contract along a common axis.

3. A valve as defined in claim 2 in which the axis along which the bellows elements expand and contract is normal to the plane of the valve seat.

4. A valve as defined in claim 1 in which the valve body is formed with said pressure equalizing passage.

5. A valve as defined in claim 1 in which the means securing the bellows elements to the casing comprises an anchoring member, means securing the anchoring member to the casing, means securing said inner bellows element to the anchoring member, means securing the other bellows element to the anchoring member in spaced relation to said inner bellows element and the anchoring member being formed with a filler passage communicating with the space between the bellows elements, said passage being closed.

6. A valve as defined in claim 5 in which the filler passage opens at one end into said space between the bellows elements and at the other end into the working chamber and spaced from said casing, and means carried by the anchoring member normally sealing the filler passage.

7. A valve as defined in claim 1 in which the means securing the bellows elements to the casing comprises means insulating the bellows elements against conductive heat transfer in relation to the casing.

8. A valve as defined in claim 1 in which said inner bellows element has an effective area substantially equal to that of the valve seat.

References Cited in the file of this patent
UNITED STATES PATENTS

| | | |
|---|---|---|
| 1,656,373 | Fitts | Jan. 17, 1928 |
| 1,816,142 | Clifford | July 28, 1931 |
| 1,844,553 | Barlow | Feb. 9, 1932 |
| 1,979,109 | Johnson | Oct. 30, 1934 |
| 2,513,875 | Johnson | July 4, 1950 |
| 2,538,436 | Weinberg | Jan. 16, 1951 |